(12) United States Patent
Kurabayashi

(10) Patent No.: US 11,275,535 B2
(45) Date of Patent: Mar. 15, 2022

(54) IMAGE FORMING APPARATUS FOR ADJUSTING PIXELS IN IMAGE DATA WHEN AN INK EJECTION FAILURE OCCURS IN A NOZZLE

(71) Applicant: Konica Minolta Inc., Tokyo (JP)

(72) Inventor: Kazuhiro Kurabayashi, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/926,217

(22) Filed: Jul. 10, 2020

(65) Prior Publication Data

US 2021/0048963 A1 Feb. 18, 2021

(30) Foreign Application Priority Data

Aug. 13, 2019 (JP) .............................. JP2019-148530

(51) Int. Cl.
*G06F 3/12* (2006.01)
*B41J 2/045* (2006.01)

(52) U.S. Cl.
CPC .......... *G06F 3/121* (2013.01); *B41J 2/04581* (2013.01); *G06F 3/1234* (2013.01)

(58) Field of Classification Search
CPC .... G06F 3/121; G06F 3/1234; B41J 2/04581; B41J 2/2146; B41J 2/2139
See application file for complete search history.

(56) References Cited

U.S. PATENT DOCUMENTS

| | | | |
|---|---|---|---|
| 6,637,853 B1* | 10/2003 | Ahne | B41J 2/16579 347/19 |
| 2013/0194339 A1* | 8/2013 | Hawkins | B41J 2/02 347/15 |
| 2015/0037545 A1* | 2/2015 | Sun | G06F 3/125 428/195.1 |
| 2018/0022112 A1* | 1/2018 | Billow | B41J 2/0458 347/47 |
| 2018/0043681 A1* | 2/2018 | Murayama | B41J 2/2146 |
| 2018/0147833 A1* | 5/2018 | Fukazawa | B41J 2/04581 |
| 2020/0247137 A1* | 8/2020 | Otani | B41J 2/04593 |

FOREIGN PATENT DOCUMENTS

JP 2017-170862 A 9/2017

* cited by examiner

*Primary Examiner* — Benjamin O Dulaney

(74) *Attorney, Agent, or Firm* — Lucas & Mercanti, LLP

(57) ABSTRACT

An image forming apparatus includes a hardware processor that: adjusts positions of pixels in image data when an ink ejection failure occurs in a nozzle that forms an image by ejecting ink, so as to reduce an influence of the ink ejection failure when forming an image based on the image data; and adds pixels to an area in the image data where pixels have disappeared due to the adjustment of the hardware processor.

13 Claims, 8 Drawing Sheets

IMAGE FORMING APPARATUS FOR ADJUSTING PIXELS IN IMAGE DATA WHEN AN INK EJECTION FAILURE OCCURS IN A NOZZLE

The entire disclosure of Japanese patent Application No. 2019-148530, filed on Aug. 13, 2019, is incorporated herein by reference in its entirety.

BACKGROUND

Technological Field

The present invention relates to an image forming apparatus, an image data adjustment method, and an image data adjustment program.

Description of the Related Art

There have been inkjet image forming apparatuses that eject ink onto a recording medium transported by a transportation device from nozzle orifices of a plurality of aligned nozzles, thereby forming an image on the recording medium. In these inkjet image forming apparatuses, ink ejection failures (also referred to as nozzle missing) can occur, such as clogging of a nozzle or the like decreasing the amount of ink ejection from the nozzle orifice from the initial value and further completely blocking the ejection, or changing the ejection direction.

In the inkjet image forming apparatuses, such ink ejection failures lead to a deterioration in the quality of images formed. Thus, the inkjet image forming apparatuses have regularly inspected the state of ink ejection from nozzle orifices. For the inspection of the ink ejection state, there is a method of capturing a test image formed on a recording medium and analyzing the captured image data. This method has determined an ink ejection failure from each nozzle orifice by causing each nozzle orifice to eject ink individually, and checking the presence or absence of ejection and the density of the ink.

In inkjet recording apparatuses, there are also a complementary technique of adjusting the amount of ink ejection from a nozzle orifice adjacent to a defective nozzle causing an ink ejection failure, based on such an inspection result, thereby compensating for a deterioration in the quality of a formed image caused by the ink ejection failure, and a technique of removing the cause of clogging such as dried ink by cleaning an ink ejection surface.

JP 2017-170862 A describes a technique of taking an out-of-range nozzle that is outside an ejection state allowable range out of use, and adjusting the positions of pixels in image data.

However, the technique described in JP 2017-170862 A has a problem that by adjusting the positions of pixels in image data (especially, rotation or scaling down), an image giving an impression very different from that of an image originally required (expected) by the user is formed on a recording medium, resulting in a deterioration in the quality of the formed image.

SUMMARY

It is an object of the present invention to provide an image forming apparatus, an image data adjustment method, and an image data adjustment program capable of preventing the formation of an image giving an impression very different from that of an image originally required by a user.

To achieve the abovementioned object, according to an aspect of the present invention, an image forming apparatus reflecting one aspect of the present invention comprises a hardware processor that: adjusts positions of pixels in image data when an ink ejection failure occurs in a nozzle that forms an image by ejecting ink, so as to reduce an influence of the ink ejection failure when forming an image based on the image data; and adds pixels to an area in the image data where pixels have disappeared due to the adjustment of the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
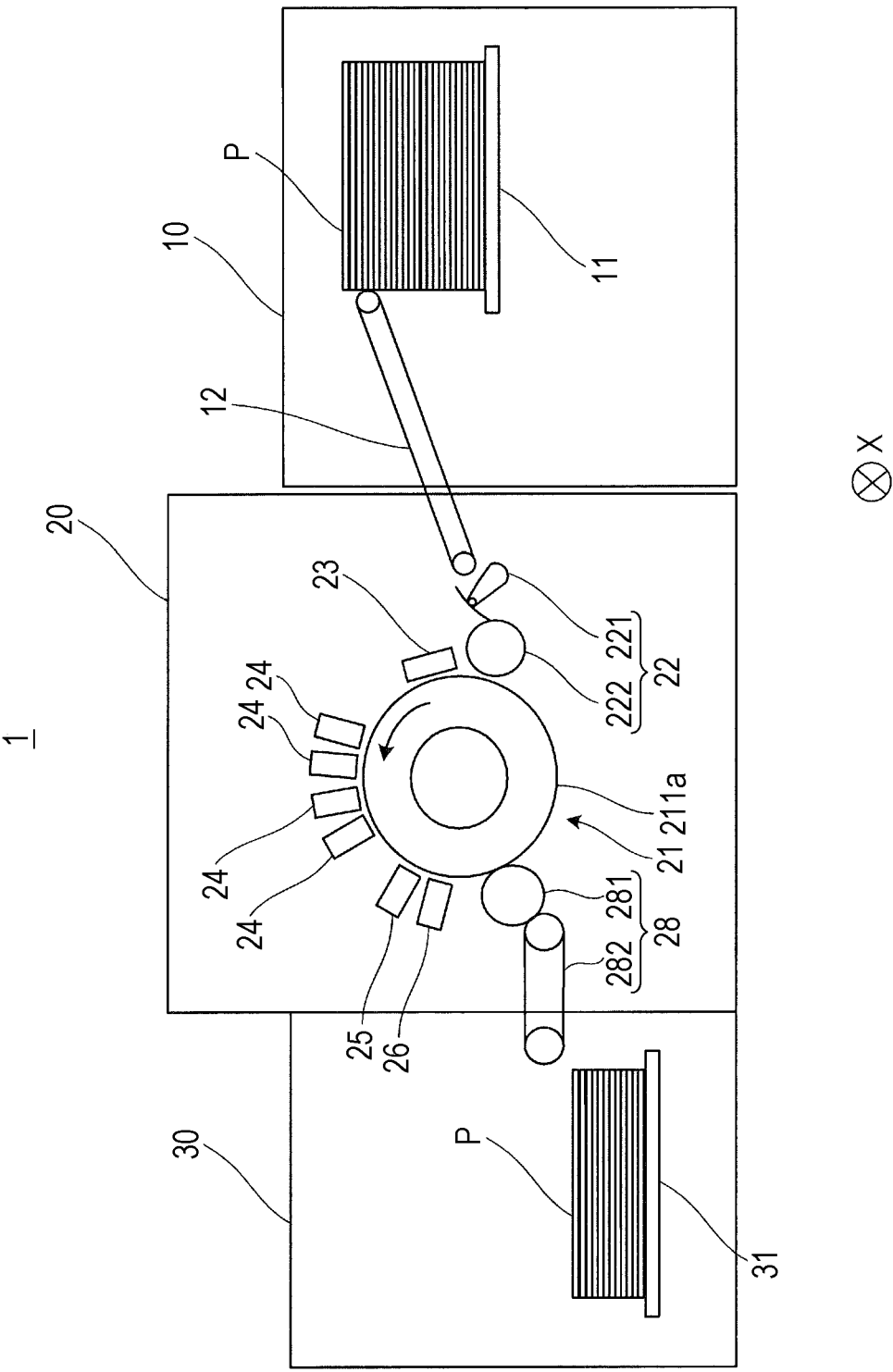
FIG. 1 is a diagram showing a schematic configuration of an inkjet image forming apparatus.

FIG. 1 is a diagram showing a schematic configuration of an inkjet image forming apparatus 1. The inkjet image forming apparatus 1 includes a paper feed section 10, an image forming section 20, a paper output section 30, and a controller 40 (see FIG. 4).

Under the control of the controller 40, the inkjet image forming apparatus 1 transports a recording medium P stored in the paper feed section 10 to the image forming section 20, forms an image on the recording medium P in the image forming section 20, and transports the recording medium P on which the image has been formed to the paper output section 30. As the recording medium P, in addition to paper such as plain paper and coated paper, various media including cloth and sheet-shaped resin can be used which allow ink landed on a surface to be fixed thereto.

The paper feed section 10 includes a paper feed tray 11 in which the recording medium P is stored, and a medium feeder 12 that transports and feeds the recording medium P from the paper feed tray 11 to the image forming section 20. The medium feeder 12 includes an annular belt supported by two rollers on the inside, and rotates the rollers with the recording medium P placed on the belt, thereby transporting the recording medium P from the paper feed tray 11 to the image forming section 20.

The image forming section 20 includes a transport unit 21, a hand-over unit 22, a heating unit 23, head units 24 (which function as an "image forming part" of the present invention), a fixing unit 25, an image reading unit 26, a delivery unit 28, and others.

The transport unit 21 performs a transport operation of holding the recording medium P placed on a transport surface 211a (placement surface) of a cylindrical transport drum 211 (see FIG. 3), and rotating the transport drum 211 about a rotation axis (cylindrical shaft) extending in an X direction, moving it around, thereby transporting the recording medium P on the transport drum 211 in a transport direction (Y direction). The transport drum 211 includes a claw and a suction unit (not shown) for holding the recording medium P on its transport surface 211a. The recording medium P is held by the claw at an edge thereof, and is drawn by the suction unit onto the transport surface 211a, thereby being held on the transport surface 211a. The transport unit 21 is connected to a transport drum motor (not shown) for rotating the transport drum 211. The transport drum 211 rotates by an angle proportional to the amount of rotation of the transport drum motor.

The hand-over unit 22 hands over the recording medium P transported by the medium feeder 12 of the paper feed section 10 to the transport unit 21. The hand-over unit 22 is provided at a position between the medium feeder 12 of the paper feed section 10 and the transport unit 21, and holds and takes up one end of the recording medium P transported from the medium feeder 12 with a swing arm 221, and hands over it to the transport unit 21 via a hand-over drum 222.

The heating unit 23 is provided between the arrangement position of the hand-over drum 222 and the arrangement position of the head units 24, and heats the recording medium P transported by the transport unit 21 so that the recording medium P has a temperature within a predetermined temperature range. The heating unit 23 includes, for example, an infrared heater or the like, and energizes the infrared heater based on a control signal provided from the controller 40 (see FIG. 4), thereby causing the infrared heater to generate heat.

The head units 24 eject ink onto the recording medium P from nozzle orifices provided in ink ejection surfaces facing the transport surface 211a of the transport drum 211, at proper timings in accordance with the rotation of the transport drum 211 on which the recording medium P is held, thereby forming an image. The head units 24 are disposed such that the ink ejection surfaces are separate from the transport surface 211a by a predetermined distance. In the inkjet image forming apparatus 1 in the present embodiment, four head units 24 corresponding to inks of four colors of yellow (Y), magenta (M), cyan (C), and black (K), individually, are aligned at predetermined intervals in the order of the colors of Y, M, C, and K from the upstream side in the transport direction of the recording medium P.

Figure 2:
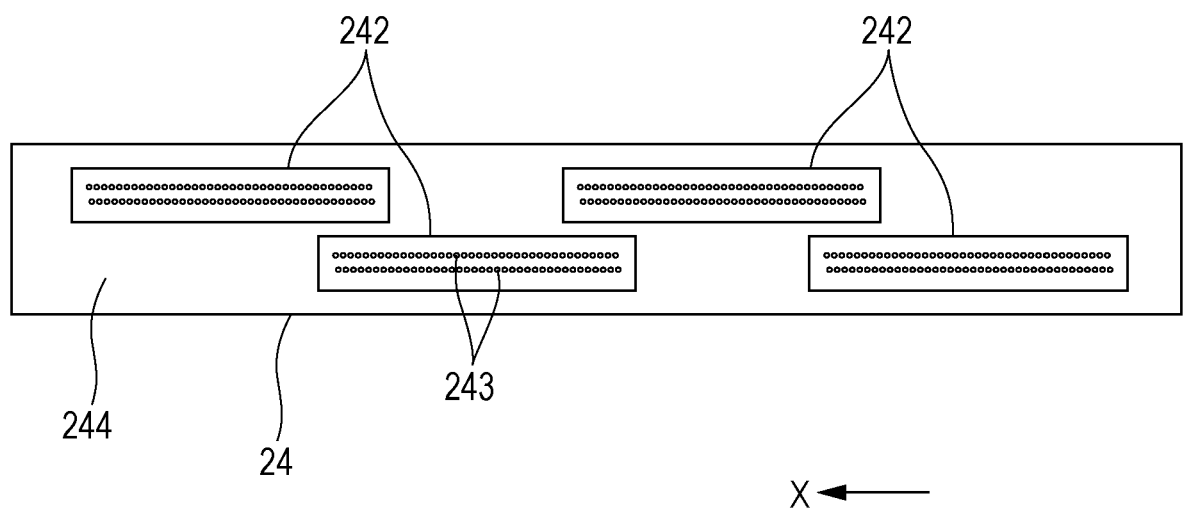
FIG. 2 is a schematic diagram showing a configuration of a head unit.

FIG. 2 is a schematic diagram showing a configuration of the head unit 24. Here, a surface of the head unit 24 facing the transport surface 211a of the transport drum 211 is shown.

The head unit 24 includes four recording heads 242 mounted to a mounting member 244. Each of the recording heads 242 is provided with a plurality of recording elements each including a pressure chamber for storing ink, a piezoelectric element provided at a wall surface of the pressure chamber, and a nozzle 243. When a drive signal to deform the piezoelectric element is input to the recording element, the pressure chamber is deformed by the deformation of the piezoelectric element, changing the pressure in the pressure chamber, and ejecting the ink from the nozzle communicating with the pressure chamber.

At each recording head 242, two nozzle rows are formed which include the nozzles 243 aligned at equal intervals in a direction intersecting with the transport direction of the recording medium P (in the present embodiment, a direction orthogonal to the transport direction, that is, the X direction). The two nozzle rows are provided such that the arrangement positions of the nozzles 243 are shifted from each other in the X direction by one-half of an arrangement interval of the nozzles 243 in each nozzle row.

In the recording heads 242, processing variations at the formation of the nozzles 243, characteristic variations of the piezoelectric elements, clogging of a nozzle 243, blockage due to adhesion of foreign matter to a nozzle orifice, or the like may cause a nozzle 243 with an ink ejection failure (a defective nozzle). A method of detecting a defective nozzle will be described later.

The four recording heads 242 are arranged in a zigzag pattern so that the arrangement areas of the nozzle rows in the X direction are connected without a break. The arrangement areas of the nozzles 243 included in the head unit 24 in the X direction cover the width in the X-direction of an image formation area of the recording medium P transported by the transport unit 21. During image formation, the head unit 24 is used with its position fixed with respect to the rotation axis of the transport drum 211. That is, the head unit 24 has a line head capable of ejecting ink across an image formable width in the X direction with respect to the recording medium P. The inkjet image forming apparatus 1 is a single-pass inkjet image forming apparatus.

The number of nozzle rows of each recording head 242 may be one or three or more, instead of two. The number of recording heads 242 of each head unit 24 may be three or less or five or more, instead of four.

As the ink ejected from the nozzles of the recording elements, one having a property of undergoing a phase change into a gel or a sol depending on temperature, and being cured by irradiation with energy rays such as ultraviolet rays is used. In the present embodiment, ink that is a gel at room temperature and becomes a sol when heated is used. Each head unit 24 includes an ink heater (not shown) that heats the ink stored in the head unit 24. The ink heater operates under the control of the controller 40, and heats the ink to a temperature at which it becomes a sol.

The recording heads 242 eject the ink heated to be a sol. When the sol ink is ejected onto the recording medium P, ink droplets that have landed on the recording medium P are naturally cooled, so that the ink quickly becomes a gel and solidifies on the recording medium P.

The fixing unit 25 includes a light-emitting part disposed across the width of the transport unit 21 in the X-direction, and irradiates the recording medium P placed on the transport unit 21 with energy rays such as ultraviolet rays from the light-emitting part, curing and fixing the ink ejected onto the recording medium P. The light-emitting part of the fixing unit 25 is disposed between the arrangement position of the head units 24 and the arrangement position of the hand-over drum 281 of the delivery unit 28 in the transport direction, facing the transport surface 211a.

The image reading unit 26 is disposed at a position between the position of ink fixing by the fixing unit 25 and the arrangement position of the hand-over drum 281 in the transport direction, so as to be able to read the surface of the recording medium P on the transport surface 211a. In the present embodiment, the image reading unit 26 reads the surface of the recording medium P transported by the transport unit 21 in a predetermined reading range, and outputs imaging data to the controller 40.

Figure 3:
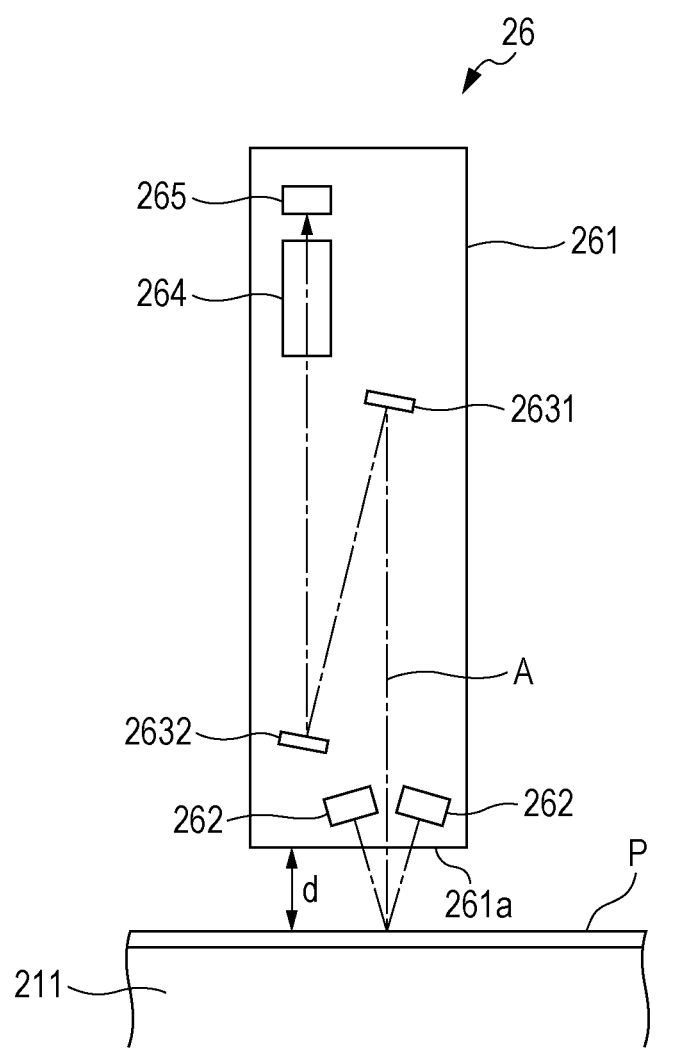
FIG. 3 is a schematic cross-sectional view illustrating a configuration of an image reading unit.
Figure 3:
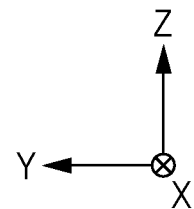

FIG. 3 is a schematic cross-sectional view illustrating a configuration of the image reading unit 26. FIG. 3 schematically shows the configuration of the image reading unit 26 in a cross section perpendicular to the X direction. The image reading unit 26 includes a housing 261 and a pair of light sources 262, mirrors 2631 and 2632, an optical system 264, and a line sensor 265 housed in the housing 261.

The housing 261 is a rectangular parallelepiped member disposed with a surface thereof facing the transport surface 211a. The surface of the housing 261 facing the transport surface 211a is a light transmission surface 261a that is formed using a member having light transparency such as glass. Hereinafter, the transport direction of the recording medium P at a position facing the light transmission surface 261a is the Y direction, and a direction perpendicular to an X-Y plane is a Z direction.

Each of the pair of light sources 262 is a line light source including a plurality of light-emitting diodes (LEDs) aligned in an area covering an area where an image can be formed by the head units 24 in the X direction. The pair of light sources 262 are disposed at positions symmetric with respect to a predetermined reference plane A perpendicular to the transport direction, and emit light onto the recording medium P on the transport surface 211a through the light transmission surface 261a of the housing 261. The angles of the light sources 262 are adjusted such that light is emitted at the same incident angle onto a line of the recording medium P intersecting with the reference plane A when the distance between the light transmission surface 261a and the recording medium P on the transport surface 211a is a predetermined standard distance d.

The mirror 2631 has a length corresponding to the arrangement area of the light source 262 in the X direction, and reflects light traveling along the reference plane A of the light emitted from the light sources 262 and reflected off the recording medium P, in the direction of the mirror 2632. The mirror 2632 is provided at a position closer to the light transmission surface 261a than the mirror 2631, and reflects light reflected off the mirror 2631 in the direction of the optical system 264. By the mirrors 2631 and 2632 being provided in this way, a proper optical path length is provided in the housing 261.

The optical system 264 concentrates incident light from the mirror 2632 onto the positions of imaging elements of the line sensor 265. The optical system 264 is adjusted such that an image of the surface of the recording medium P is formed at the positions of the imaging elements of the line sensor 265, that is, the surface of recording medium P is focused on when the distance between the light transmission surface 261a and the recording medium P on the transport surface 211a is the predetermined standard distance d. As the optical system 264, for example, one with a large number of gradient index lenses aligned which concentrate incident light onto predetermined positions using a refractive-index distribution in a direction perpendicular to the optical axis can be used.

The line sensor 265 has a configuration in which a plurality of imaging elements that output signals corresponding to the intensity of incident light is aligned in the X direction. Specifically, in the line sensor 265, the imaging elements are provided in three rows in the X direction, and the imaging elements in each row output signals corresponding to the intensity of the red (R), green (G), or blue (B) wavelength component of the incident light. For the imaging elements corresponding to R, G, or B, for example, those can be used which have color filters that transmit light of the R, G, or B wavelength component disposed on light-receiving portions of a charge-coupled device (CCD) sensor or a complementary metal-oxide semiconductor (CMOS) sensor that includes photodiodes as photoelectric conversion elements. The image reading unit 26 may use an area sensor instead of the line sensor 265.

Signals output from the line sensor 265 are subjected to current-voltage conversion, amplification, noise removal, analog-to-digital conversion, etc. in an analog front end (not shown), and output to the controller 40 as imaging data indicating brightness values of the read image. In the present embodiment, the pixel values of the imaging data indicate the intensity of light detected by the imaging elements in 256 levels of gray from 0 to 255.

The delivery unit 28 includes a belt loop 282 having an annular belt supported by two rollers on the inside, and a cylindrical hand-over drum 281 that hands over the recording medium P from the transport unit 21 to the belt loop 282. The recording medium P handed over by the hand-over drum 281 from the transport unit 21 onto the belt loop 282 is transported by the belt loop 282 and delivered to the paper output section 30.

The paper output section 30 includes a plate-shaped paper output tray 31 on which the recording medium P delivered from the image forming section 20 by the delivery unit 28 is placed.

Figure 4:
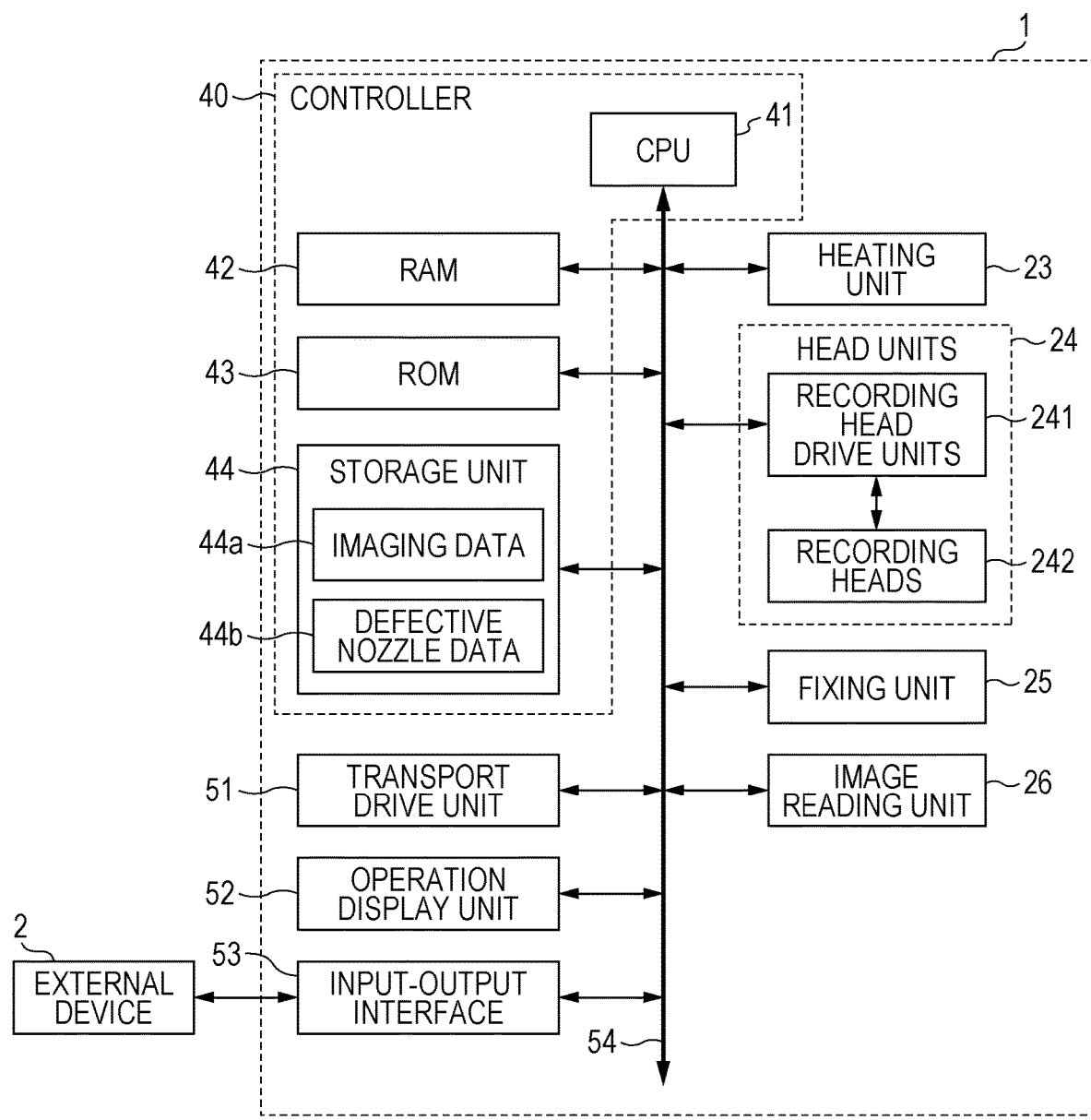
FIG. 4 is a block diagram showing a major functional configuration of the inkjet image forming apparatus.

FIG. 4 is a block diagram showing a major functional configuration of the inkjet image forming apparatus 1. The inkjet image forming apparatus 1 includes the heating unit 23, recording head drive units 241 and the recording heads 242, the fixing unit 25, the image reading unit 26, the controller 40, a transport drive unit 51, an operation display unit 52, an input-output interface 53, a bus 54, and others.

Each recording head drive unit 241 provides drive signals to deform the piezoelectric elements to the recording elements of the recording heads 242 according to image data at proper timings, thereby causing amounts of ink corresponding to the pixel values of the image data to be ejected from the nozzles 243 of the recording heads 242.

The controller 40 includes a central processing unit (CPU) 41, random-access memory (RAM) 42, read-only memory (ROM) 43, and a storage unit 44. The controller 40 functions as a "position adjustment unit" and a "pixel addition unit" of the present invention.

The CPU 41 reads various control programs (functioning as an "image data adjustment program" of the present invention) and setting data stored in the ROM 43 and stores them in the RAM 42, and executes the programs to perform various kinds of arithmetic processing. The CPU 41 performs centralized control of the entire operation of the inkjet image forming apparatus 1.

The RAM 42 provides a work memory space to the CPU 41, and stores temporary data. The RAM 42 may include nonvolatile memory.

The ROM 43 stores the various control programs executed by the CPU 41, the setting data, etc. Instead of the ROM 43, a rewritable nonvolatile memory such as an electrically erasable programmable read-only memory (EEPROM) or a flash memory may be used.

The storage unit 44 stores a print job (image forming command) input from an external device 2 via the input-output interface 53 and image data related to the print job, test image data that is image data of a test chart (test image) used in a defective nozzle detection process described later, imaging data 44a captured by the image reading unit 26, defective nozzle data 44b indicating a defective nozzle with an ejection failure, and others. Of these, the print job includes, in addition to information specifying image data related to an image to be formed, information related to the type of the recording medium P on which the image is formed (for example, the size and thickness of the recording medium P). As the storage unit 44, for example, a hard disk drive (HDD) is used, and dynamic random access memory (DRAM) or the like may be used in combination.

The transport drive unit 51 provides a drive signal to the transport drum motor of the transport drum 211 based on a control signal provided from the controller 40, to rotate the transport drum 211 at a predetermined speed and timing.

Here, the transport drive unit 51 rotates the transport drum 211 at a first speed or a second speed higher than the first speed, based on the control signal. The first speed is a speed preset as a speed when the image reading unit 26 performs reading. The second speed is a speed preset as a speed when the head units 24 perform image recording.

The transport drive unit 51 also provides a drive signal to motors for operating the medium feeder 12, the hand-over unit 22, and the delivery unit 28 based on a control signal provided from the controller 40, to cause them to feed the recording medium P to the transport unit 21 and discharge the recording medium P from the transport unit 21.

The operation display unit 52 includes a display device such as a liquid-crystal display or an organic EL display, and an input device such as operation keys or a touch panel placed on a screen of the display device. The operation display unit 52 displays various types of information on the display device, and converts a user's input operation to the input device into an operation signal and outputs it to the controller 40.

The input-output interface 53 mediates data transmission and reception between the external device 2 and the controller 40. The input-output interface 53 is formed, for example, by one of various serial interfaces and various parallel interfaces, or a combination thereof.

The bus 54 is a path for transmission and reception of signals between the controller 40 and the other components.

The external device 2 is, for example, a personal computer, and provides a print job and image data, and others to the controller 40 via the input-output interface 53.

Next, a method of detecting a defective nozzle in the inkjet image forming apparatus 1 will be described.

In the inkjet image forming apparatus 1 in the present embodiment, detection of a defective nozzle is performed at a predetermined timing, or based on a predetermined input operation by a user to the operation display unit 52. The detection of a defective nozzle is performed by recording a predetermined test chart on the recording medium P, and analyzing imaging data obtained by imaging the test chart with the image reading unit 26.

Figure 5:
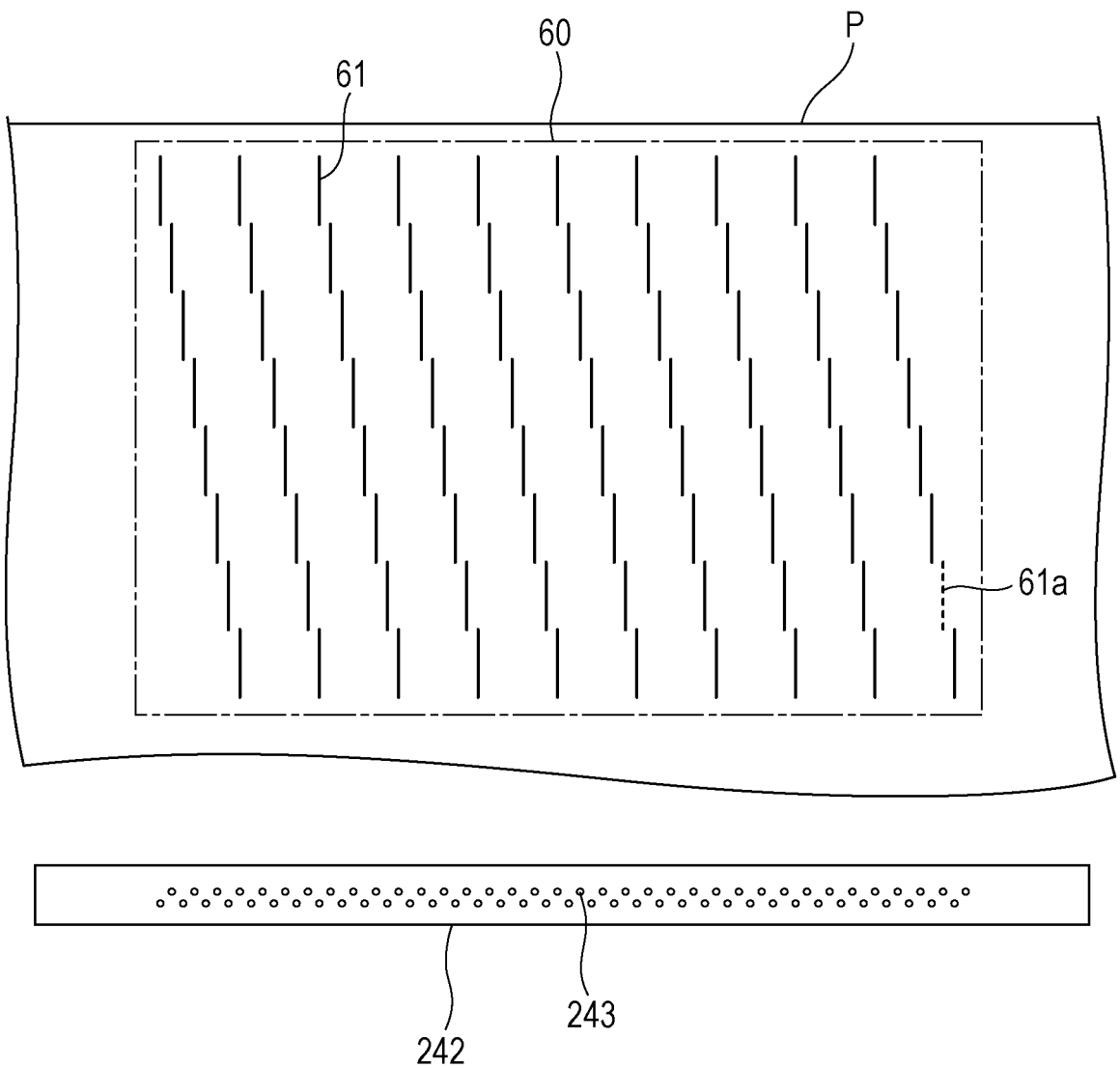
FIG. 5 is a diagram showing an example of a test chart used to detect a defective nozzle.

FIG. 5 is a diagram showing an example of the test chart used in the detection of a defective nozzle. A test chart 60 shown in FIG. 5 is an image formed on the recording medium P by the head unit 24, and includes a line pattern including a plurality of lines 61 extending in the transport direction.

FIG. 5 shows a portion of the test chart 60 recorded by one of the recording heads 242. The same line pattern is recorded by the other recording heads 242 of the head unit 24.

Each line 61 of the test chart 60 is formed by ink ejected from a single nozzle 243 of the head unit 24. In the test chart 60, lines 61 recorded by nozzles 243 adjacent in position to each other in the X direction are recorded out of line in the Y direction, and the positions in the Y direction of lines 61 recorded by every eighth nozzle 243 coincide with each other.

Each of the plurality of lines 61 in the test chart 60 corresponds to one of the plurality of nozzles 243. Thus, if an abnormality is found in a specific line 61 in the imaging data of the test chart 60 captured by the image reading unit 26, the nozzle 243 corresponding to the specific line 61 can be specified as a defective nozzle. For example, if a line 61a shown in FIG. 5 is missing in the imaging data of the test chart 60, the nozzle 243 corresponding to the line 61a is identified as a defective nozzle that does not eject ink.

If the density of a specific line 61 in the imaging data of the test chart 60 is out of a predetermined reference range, the nozzle 243 corresponding to the specific line 61 is identified as a defective nozzle with an abnormality in the amount of ink ejection.

If a specific line 61 is not formed in a predetermined area corresponding to the position of the nozzle 243 in the imaging data of the test chart 60, the nozzle 243 corresponding to the specific line 61 is identified as a defective nozzle with an abnormality in the direction of ink ejection. When a defective nozzle is identified, the defective nozzle data 44b indicating the array number of the defective nozzle in the head unit 24 is stored in the storage unit 44.

If a print job is stored in the storage unit 44, and an image forming operation to form an image related to the print job on the recording medium P is performed after a defective nozzle is identified, the defective nozzle data 44b is referred to, and image data is corrected so as to supplement an ink ejection failure of the defective nozzle. Then, an image is formed based on the corrected image data. This allows an image to be formed with a proper image quality even if there is a defective nozzle.

Next, a defective nozzle detection process to detect a defective nozzle, and an image forming process using a result of detection of a defective nozzle will be described.

Figure 6:
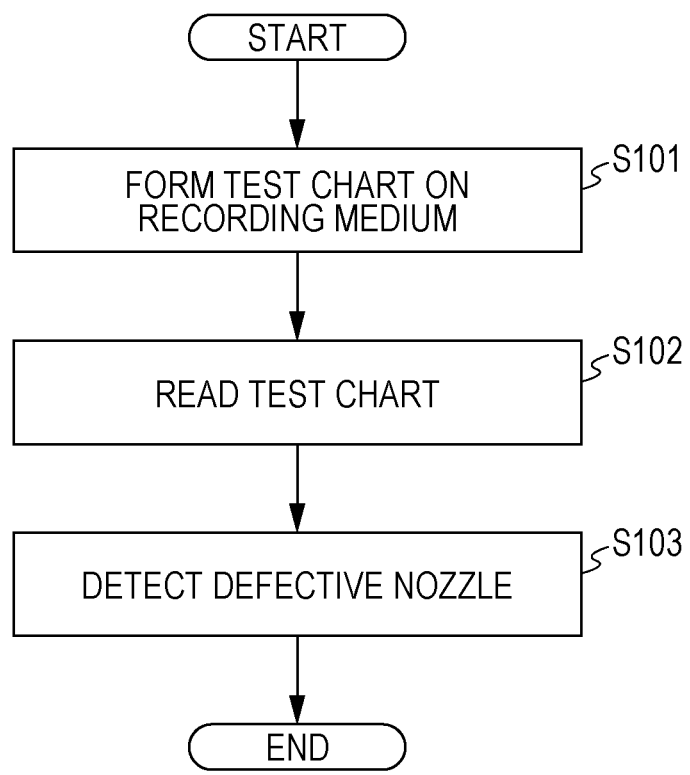
FIG. 6 is a flowchart showing an example of a defective nozzle detection process in the present embodiment.

FIG. 6 is a flowchart showing an example of the defective nozzle detection process. The defective nozzle detection process is performed when a user performs a predetermined input operation on the operation display unit 52 to provide an instruction to perform defective nozzle detection. Alternatively, the defective nozzle detection process may be performed at a predetermined timing, such as during manufacturing or before shipment of the inkjet image forming apparatus 1, or when image formation has been performed on a predetermined number of sheets of the recording medium P by the inkjet image forming apparatus 1.

First, the controller 40 controls the head units 24 to form a test chart 60 on the recording medium P (step S101). That is, the controller 40 causes the transport drive unit 51 to output a drive signal to the transport drum motor of the transport drum 211 to rotate the transport drum 211 at the second speed described above. Then, the controller 40 causes the recording head drive units 241 to provide test image data related to the test chart 60 stored in the storage unit 44 to the recording heads 242, to cause the head units 24 to eject ink onto the recording medium P to form the test chart 60 on the recording medium P.

At the timing when the recording medium P onto which the ink has been applied moves to the position of the fixing unit 25, the controller 40 causes the fixing unit 25 to irradiate the ink with predetermined energy rays to fix the ink to the recording medium P.

Next, the controller 40 causes the image reading unit 26 to read the recording medium P on which the test chart 60 has been formed (step S102). That is, the controller 40 causes the transport drive unit 51 to output a drive signal to the transport drum motor of the transport drum 211 to rotate the transport drum 211 at the first speed. The controller 40 causes the image reading unit 26 to repeatedly read the test chart 60 on the recording medium P at proper timings according to the rotation of the transport drum 211 to obtain the imaging data 44a and store it in the storage unit 44.

Finally, the controller 40 detects a defective nozzle based on the imaging data of the test chart 60 (step S103). That is, the controller 40 specifies a line 61 in which an abnormality is found from the imaging data of the test chart 60, and identifies the nozzle 243 corresponding to the line 61 as a defective nozzle. The controller 40 generates the defective nozzle data 44b indicating the array number of the identified defective nozzle in the head unit 24, and stores it in the storage unit 44. When the processing in step S103 is finished, the controller 40 finishes the defective nozzle detection process.

Figure 7:
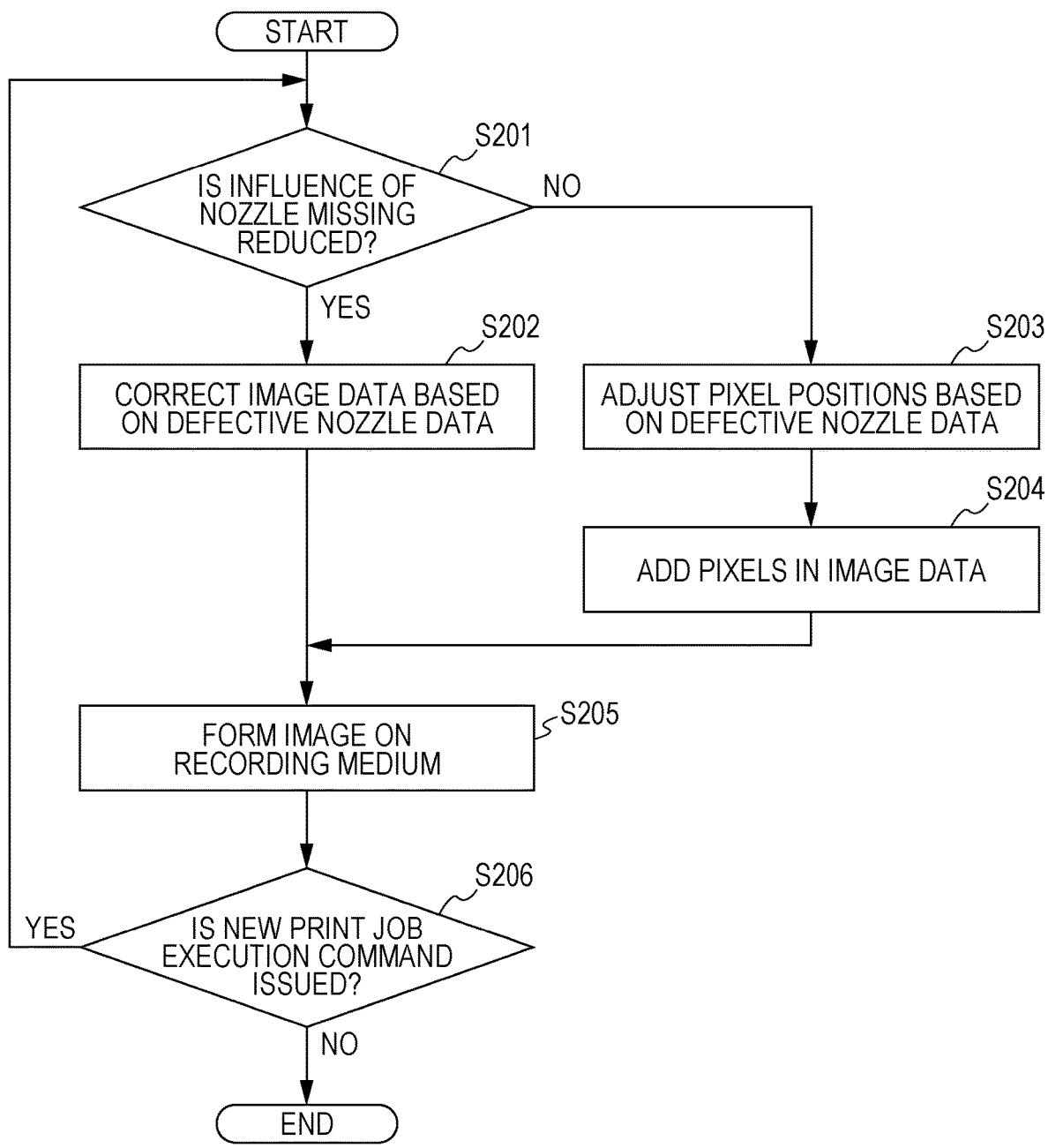
FIG. 7 is a flowchart showing an example of an image forming process in the present embodiment.

FIG. 7 is a flowchart showing an example of the image forming process. The image forming process is performed when a print job and image data are input from the external device 2 to the controller 40 via the input-output interface 53. Prior to the start of the image forming process, the controller 40 causes the transport drive unit 51 to output a drive signal to the transport drum motor of the transport drum 211 to start a rotation operation of the transport drum 211 at the second speed.

First, the controller 40 refers to the image data and the defective nozzle data 44b, and determines whether or not the influence of an ink ejection failure (specifically, the deterioration of the quality of a formed image) is reduced by adjusting the ejection amount of ink ejected from an adjacent nozzle adjacent to a defective nozzle causing the ink ejection failure (step S201).

As a result of the determination, if the influence of the ink ejection failure is reduced (step S201, YES), the controller 40 corrects the image data based on the defective nozzle data 44b (step S202). That is, the controller 40 corrects the image data to prevent ink ejection by the defective nozzle and to supplement the non-ejection of the ink by an increase in the amount of ink ejection from the adjacent nozzle. The controller 40 stores the corrected image data in the storage unit 44. Then, the process proceeds to step S205.

On the other hand, if the influence of the ink ejection failure is not reduced (step S201, NO), the controller 40 adjusts the positions of pixels in the image data to reduce the influence of the ink ejection failure when forming an image based on the image data (step S203). Alternatively, the controller 40 may adjust the positions of pixels in the image data according to the amount of adjustment designated by the user.

Next, the controller 40 adds pixels to an area where pixels have disappeared due to the adjustment in the image data after the pixel positions have been adjusted (step S204). The controller 40 stores the image data after the pixel addition in the storage unit 44. Then, the process proceeds to step S205.

FIGS. 8A to 8D are diagrams illustrating an example of the processing (image data adjustment processing) in steps S203 and S204.

Figure 8A:
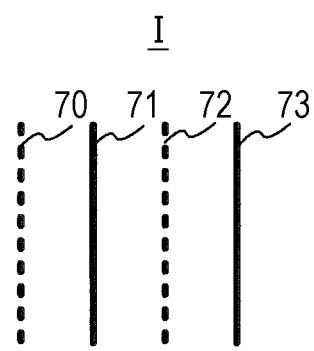
FIGS. 8A to 8D are diagrams illustrating an example of an image data adjustment process in the present embodiment.

FIG. 8A shows a partial image I of the image corresponding to the image data before the processing in steps S203 and S204 is performed. As shown in FIG. 8A, the image I includes dotted line images 70 and 72 and solid line images 71 and 73. The dotted line images 70 and 72 and the solid line images 71 and 73 are alternately arranged at predetermined intervals in the horizontal direction in the figure. That is, the image has periodicity. The image corresponding to the image data is an image in which the image I is periodically repeated in a direction intersecting with the transport direction of the recording medium P.

Figure 8B:
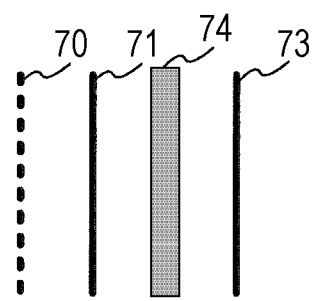

FIG. 8B shows an area 74 where ink is ejected from a plurality of nozzles (defective nozzles) continuously aligned in a direction intersecting with the transport direction of the recording medium P when ink ejection failures occur in the defective nozzles (when continuous missing occurs) in FIG. 8A. In this case, the dotted line image 72 is included in the area 74. Even by adjusting the ejection amount of ink ejected from an adjacent nozzle adjacent to the defective nozzles, it is difficult to reduce the influence of the nozzle missing of the defective nozzles (specifically, the deterioration of the quality of the formed image due to the ink ejection failures).

Figure 8C:
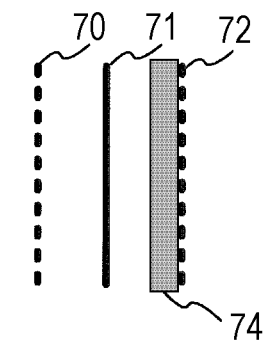

Thus, the controller 40 adjusts the positions of pixels in the image data to reduce the influence of the ink ejection failures when forming an image based on the image data. In an example shown in FIG. 8C, the controller 40 moves the positions of pixels of the dotted line images 70 and 72 and the solid line images 71 and 73 to the right in the figure so that the dotted line image 72 is not included in the area 74. In this case, as shown in FIG. 8C, the positions of pixels of the solid line image 73 are moved to the outside of the image forming area, and the solid line image 73 cannot be formed. If this is left as it is, an image giving an impression very different from that of the originally required image will be formed on the recording medium P, resulting in a deterioration in the quality of the formed image.

Figure 8D:
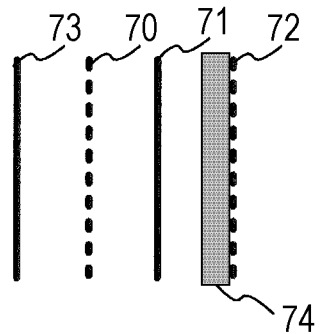

Thus, in the present embodiment, as shown in FIG. 8D, the controller 40 adds the pixels of the solid line image 73 (in this example, pixels based on the periodicity of the image I) to an area where pixels have disappeared due to the adjustment in the image data after the positions of the pixels of the solid line image 73 have been moved (adjusted). Since the image I is an image having periodicity, the image (printed matter) finally obtained by the pixel addition can be said to be equivalent to the image required by the user. Consequently, as compared with the case where the pixels of the solid line image 73 are not added to an area where pixels have disappeared, it can be prevented that an image giving an impression very different from that of the originally required image is formed on the recording medium P, resulting in a deterioration in the quality of the formed image. The periodicity (feature) of the image I may be set by the user, or may be determined by image analysis processing of the controller 40. Added pixels do not necessarily have to be the pixels of the solid line image 73, but are desirably pixels of an image that does not give the user an impression very different from that of the originally required image.

In step S205, the controller 40 causes the head units 24 to form an image on the recording medium P based on the image data stored in the storage unit 44 after step S202 or step S204. That is, the controller 40 causes the recording head drive units 241 to provide the image data stored in the storage unit 44 to the recording heads 242 at proper timings according to the rotation of the transport drum 211, thereby causing the head units 24 to eject ink onto the recording medium P to form an image on the recording medium P.

At the timing when the recording medium P onto which the ink has been applied moves to the position of the fixing unit 25, the controller 40 causes the fixing unit 25 to irradiate the ink with predetermined energy rays to fix the ink to the recording medium P.

Next, the controller 40 determines whether or not a new print job execution command is issued (acquired) (step S206). As a result of the determination, if a new print job execution instruction is issued (step S206, YES), the controller 40 causes the process to proceed to step S201.

On the other hand, if no new print job execution command is issued (step S206, NO), the controller 40 finishes the image forming process. In the flowchart of FIG. 7, the processing of steps S203 and S204 may be performed regardless of whether or not the influence of an ink ejection failure is reduced by adjusting the ejection amount of ink ejected from an adjacent nozzle adjacent to a defective nozzle causing an ink ejection failure.

As described in detail above, the inkjet image forming apparatus 1 in the present embodiment includes the position adjustment unit (controller 40) that adjusts the positions of pixels in image data when an ink ejection failure occurs in a nozzle that forms an image by ejecting ink, so as to reduce the influence of the ink ejection failure when forming an image based on the image data, and the pixel addition unit (controller 40) that adds pixels to an area in the image data where pixels have disappeared due to the adjustment of the position adjustment unit.

According to the present embodiment configured in this way, an image (printed matter) finally obtained by the addition of pixels to an area where pixels have disappeared is equivalent to an image originally required by a user. As compared with the case where no pixels are added, it can be prevented that an image giving an impression very different from that of an originally required image is formed on the recording medium P, resulting in a deterioration in the quality of the formed image.

In the above embodiment, the controller 40 may adjust the positions of pixels in image data according to a user's setting of whether or not to permit the position adjustment of pixels in image data. For example, the controller 40 adjusts the positions of pixels in image data only when permission to adjust the positions of pixels in image data is set.

In the above embodiment, if a plurality of ink ejection failures occurs in a plurality of nozzles in a one-to-one correspondence, the controller 40 may adjust the positions of pixels in image data so that the influences of the plurality of ink ejection failures are all reduced. If all of the influences of the plurality of ink ejection failures cannot be reduced, the controller 40 may adjust the positions of pixels in the image data so that the influences of the plurality of ink ejection failures are reduced to the maximum. Further, if a plurality of ink ejection failures occurs in a plurality of nozzles in a one-to-one correspondence, the controller 40 may adjust the positions of pixels in image data so that the influence of an ink ejection failure having higher priority is reduced in preference to the influence of an ink ejection failure having lower priority.

The above embodiment has been described using an example of detecting a defective nozzle using the test chart 60 including the plurality of lines 61, but the present invention is not limited to this. For example, a gray chart including a gray-scale pattern formed by the nozzles 243 may be formed as a test image, and a defective nozzle may be detected from density variability in the results of reading the gray chart. Such a gray chart allows detection of an abnormality in the ink ejection direction of a nozzle 243, and allows easy and proper detection of an abnormality in the ink ejection amount of a nozzle 243.

The above embodiment has been described using an example in which the recording medium P moving by the rotation operation of the transport drum 211 is read by the image reading unit 26, and ink is ejected from the head units 24 onto the moving recording medium P, but the present invention is not limited to this. For example, reading of the recording medium P by the image reading unit 26 and ejection of ink onto the recording medium P by the head units 24 may be performed in a state where the rotation operation of the transport drum 211 is temporarily halted.

The above embodiment has been described using an example in which the recording medium P is transported by the transport drum 211, but the present invention is not limited to this. For example, the recording medium P may be transported by a transport belt that is supported by two rollers and moves with the rotation of the rollers. Alternatively, the recording medium P may be transported by a transport member that reciprocates on the same plane.

The above embodiment has been described with the single-pass inkjet image forming apparatus 1 as an example, but the present invention may be applied to an inkjet image forming apparatus that records an image, scanning a head unit. Further, the present invention may be applied to an inkjet image forming apparatus in which a single nozzle is provided at a head unit.

The above embodiment has been described with the inkjet image forming apparatus 1 as an example which heats ink that is a gel at room temperature and becomes a sol by being heated, into a sol for ejection, but the present invention is not limited to this. Various types of known ink including ink that is a sol or a liquid at room temperature may be used.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising
a hardware processor that:
adjusts positions of pixels in image data when an ink ejection failure occurs in a nozzle that forms an image by ejecting ink, so as to reduce an influence of the ink ejection failure when forming an image based on the image data; and
adds pixels to an area in the image data where pixels have disappeared due to the adjustment of the hardware processor.

2. The image forming apparatus according to claim 1, wherein the hardware processor adjusts positions of pixels in the image data, according to a user's setting of whether or not to permit the adjustment.

3. The image forming apparatus according to claim 1, wherein the hardware processor adds pixels based on periodicity of the image.

4. The image forming apparatus according to claim 3, wherein the periodicity of the image is set by a user.

5. The image forming apparatus according to claim 1, wherein the hardware processor adjusts positions of pixels in the image data when the influence of the ink ejection failure is not reduced by adjustment of an ejection amount of ink ejected from an adjacent nozzle adjacent to the nozzle.

6. The image forming apparatus according to claim 1, wherein when a plurality of ink ejection failures occurs in a plurality of the nozzles in a one-to-one correspondence, the hardware processor adjusts positions of pixels in the image data so that influences of the plurality of ink ejection failures are all reduced.

7. The image forming apparatus according to claim 1, wherein when a plurality of ink ejection failures occurs in a plurality of the nozzles in a one-to-one correspondence, the hardware processor adjusts positions of pixels in the image data so that influences of the plurality of ink ejection failures are reduced to a maximum.

8. The image forming apparatus according to claim 1, wherein when a plurality of ink ejection failures occurs in a plurality of the nozzles in a one-to-one correspondence, the hardware processor adjusts positions of pixels in the image data so that an influence of an ink ejection failure having higher priority is reduced in preference to an influence of an ink ejection failure having lower priority.

9. The image forming apparatus according to claim 1, further comprising an image forming part that forms an image on a recording medium, based on the image data after the pixels are added by the hardware processor.

10. The image forming apparatus according to claim 1, wherein the hardware processor adjusts the positions of the pixels by moving all pixels in the image data in one direction.

11. The image forming apparatus according to claim 10, wherein the hardware processor adds pixels to compensate for pixels that are moved outside of the image forming area by the moving of all pixels in the image data in the one direction.

12. An image data adjustment method comprising:
adjusting positions of pixels in image data when an ink ejection failure occurs in a nozzle that forms an image by ejecting ink, so as to reduce an influence of the ink ejection failure when forming an image based on the image data; and
adding pixels to an area in the image data where pixels have disappeared due to the adjustment.

13. A non-transitory recording medium storing a computer readable image data adjustment program causing a computer to perform:
adjusting positions of pixels in image data when an ink ejection failure occurs in a nozzle that forms an image by ejecting ink, so as to reduce an influence of the ink ejection failure when forming an image based on the image data; and
adding pixels to an area in the image data where pixels have disappeared due to the adjustment.

* * * * *